UNITED STATES PATENT OFFICE.

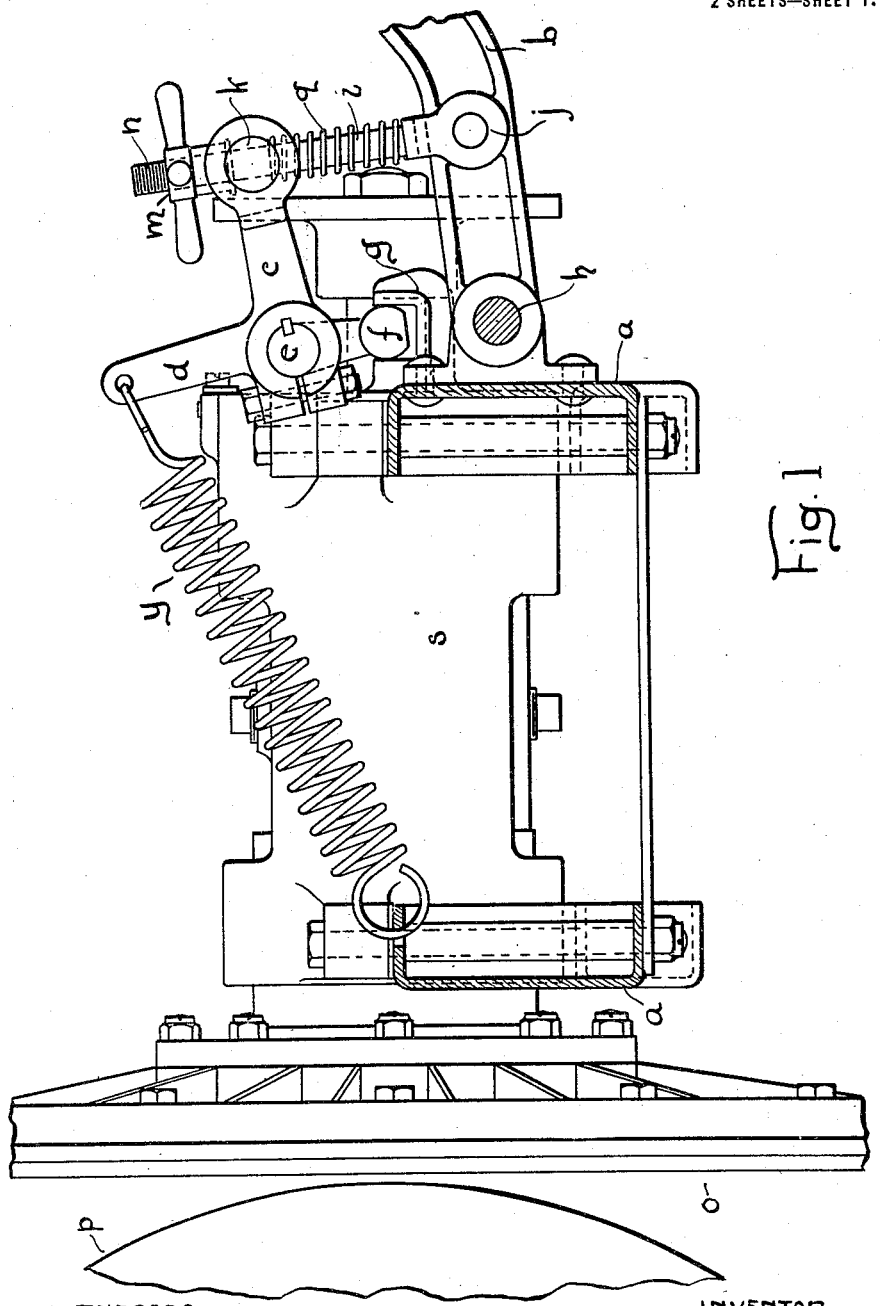

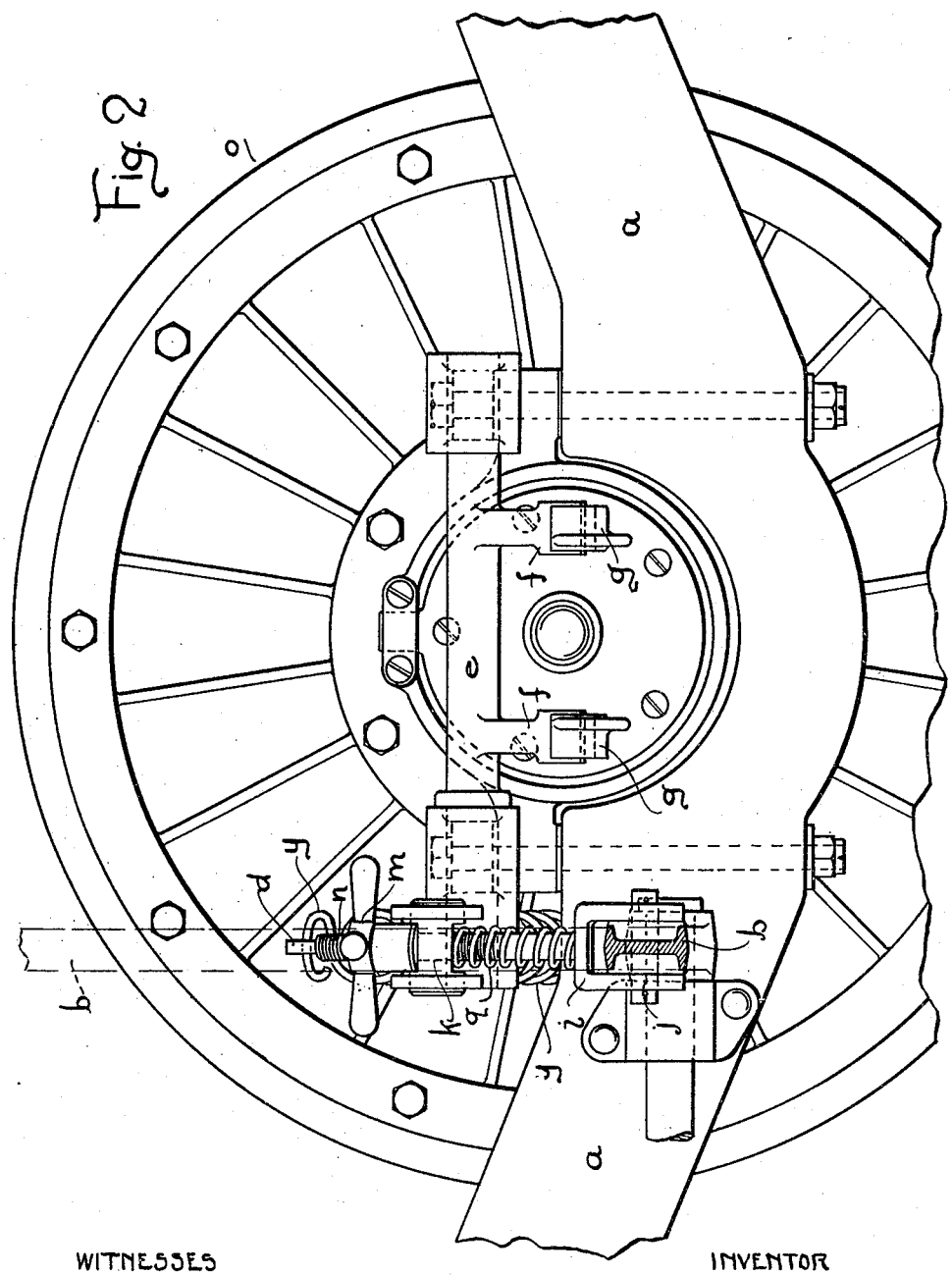

DONALD M. FERGUSON, OF DETROIT, MICHIGAN, ASSIGNOR TO GENERAL MOTORS COMPANY, OF DETROIT, MICHIGAN.

TRANSMISSION MECHANISM FOR AUTOMOBILES.

1,200,931. Specification of Letters Patent. Patented Oct. 10, 1916.

Application filed October 18, 1913. Serial No. 795,851.

*To all whom it may concern:*

Be it known that I, DONALD M. FERGUSON, a citizen of the United States, residing at Detroit, county of Wayne, State of Michigan, have invented a certain new and useful Improvement in Transmission Mechanism for Automobiles, and declare the following to be a full, clear, and exact description of the same, such as will enable others skilled in the art to which it pertains to make and use the same, reference being had to the accompanying drawings, which form a part of this specification.

My invention relates to automobiles and a special object of my improvements is to provide an improved apparatus for reciprocating the disk in a friction drive.

In the accompanying drawings: Figure 1, is a side elevation of an apparatus embodying my invention. Fig. 2, is an end view of the same looking from the right of Fig. 1.

$p$ represents the friction wheel and $o$ the friction disk. The shaft of the disk $o$ rests in a bearing in a casing $s$ which is arranged to be reciprocated so as to place the disk $o$ in contact with the wheel $p$ or separate the same.

$a$ $a$ are cross pieces of the automobile frame. Upon a bracket secured to one of these cross-pieces the actuating foot lever $b$ is pivoted at $h$.

$c$ $d$ is a two-armed lever keyed upon a rock shaft $e$.

$f$ $f$ are two engaging arms extending from the rock shaft $e$.

$g$, $g$ are rods having notches, or grooves, formed therein by which rods the casing $s$ and therefore the disk $o$ may be reciprocated. The arms $f$ $f$ terminate in disks or cams, which engage in the grooves or notches of the rods $g$.

$y$, is a tension spring one end of which is secured to a cross-piece $a$ and the other end to the outer end of the arm $d$ of the lever $c$ $d$. The spring $y$ acts to oscillate said lever and the rock shaft $e$ so as to draw the disk $o$ away from the wheel $p$.

$i$ is a connecting rod forked at its lower end extending over, and pivoted at $j$ to the foot lever $b$. The upper end of the rod $i$ passes through, and fits so as to reciprocate in, an aperture formed through an oscillating part $k$ pivoted in the outer end of the lever arm $c$.

$q$, is a spring sleeved upon the rod $i$ and bearing against a shoulder on said rod at its lower end and against the oscillating part $k$, on the lever arm $c$, at its upper end. The upper end of the rod $i$ is screw threaded at $n$ and upon this screw threaded portion is fitted a nut $m$ having handles by which it can be manipulated. The spring $q$ presses the lever arm $c$ up firmly against the nut $m$.

By turning the nut $m$ the distance between the pivotal points of the rod $i$ on the arm $c$ and on the foot lever $b$ may be adjusted. Of course the foot lever $b$ may be used for other purposes as the actuation of a clutch.

What I claim is:

1. In a friction drive apparatus for automobiles, the combination of a wheel and a disk movable toward and away from said wheel and adapted to engage the same to form the frictional engagement, a foot lever, a second lever adapted to actuate said disk, a connecting rod joining said levers, and means for adjusting the length of said connecting rod between its pivotal points on said levers, said adjusting means consisting of a nut threaded on said rod and engaging one of said levers, and a spring pressing the last named lever against said nut.

2. In a frictional drive apparatus for automobiles, a wheel, a disk movable toward and away from said wheel and adapted to engage the same to form the frictional engagement, a pair of parallel rods connected with said disk, and guided in ways, lugs upon said rods, a rock shaft, an arm extending from said rock shaft and engaging each of said rods, by means of said lugs, and means oscillating said rock shaft.

In testimony whereof, I sign this specification in the presence of two witnesses.

DONALD M. FERGUSON.

Witnesses:
 VIRGINIA C. SPRATT,
 ELLIOTT STODDARD.

Copies of this patent may be obtained for five cents each, by addressing the "Commissioner of Patents, Washington, D. C."